Sept. 22, 1925.

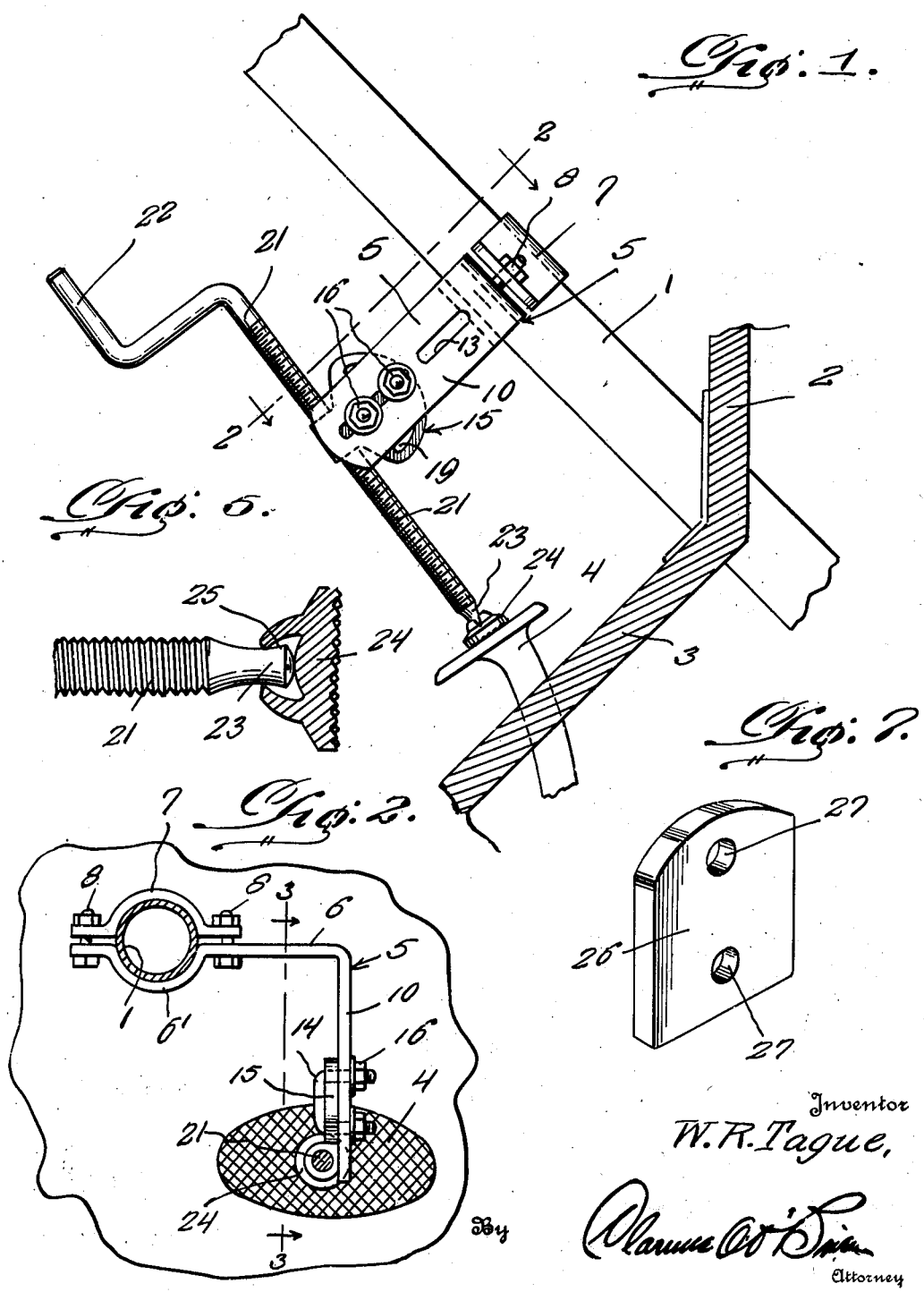

W. R. TAGUE

BRAKE PEDAL SETTING DEVICE

Filed Jan. 16, 1925

Patented Sept. 22, 1925.

1,554,468

UNITED STATES PATENT OFFICE.

WILLIAM R. TAGUE, OF WAYNESBURG, PENNSYLVANIA.

BRAKE-PEDAL-SETTING DEVICE.

Application filed January 16, 1925. Serial No. 2,865.

*To all whom it may concern:*

Be it known that I, WILLIAM R. TAGUE, a citizen of the United States, residing at Waynesburg, in the county of Greene and State of Pennsylvania, have invented certain new and useful Improvements in Brake-Pedal-Setting Devices, of which the following is a specification.

This invention relates to a device for setting the brake pedal of an automobile, in the position at which the application of the brake is desired, so that the brake bands may be properly adjusted on each of the wheels to effect an equal braking power at the point of setting of the brake pedal.

Heretofore, in the setting of the brakes of an automobile, in order to have an equal application of the brakes on each of the wheels when the brake pedals are operated to apply the brakes, it has been necessary for a mechanic, in setting these brake bands, to require the assistance of a helper for the purpose of operating and holding the brake pedals in the desired position at which the brakes are to be set. As it is substantially impossible for the human foot to hold the brake pedal in one position any appreciable length of time, which is necessary, in order that the brakes of different wheels may be properly adjusted to the brake drum, mechanics have experienced great difficulty in obtaining a proper set of the brake bands. This method of setting the brakes further requires the time of an additional mechanic as well as requiring considerable more time on the part of the mechanic adjusting the brake band to go back and forth over the various wheels of the automobiles having brakes, in order to determine that each brake is set in the proper position.

The invention contemplates the elimination of the difficulty now experienced in setting the brakes of an automobile, by providing a device which is readily attachable and detachable from the steering column of the automobile which carries suitable means for operating the brake pedal, which may be operated to depress the brake pedal to a desired position and hold the same set in this position while a mechanic adjusts the several brakes of the automobile.

The invention further contemplates the provision of a convenient form of a device adapted for ready attachment to all makes of automobiles, which is provided with a brake pedal operating member having a substantially universal connection with the portion attached to the steering column, so that it may be readily and instantly adapted to the various makes of automobiles, to permit the ready setting of the brake pedal, so that the brake bands may be properly adjusted, during the set position of the brake pedal.

The invention comprehends other improvements and objects which are more particularly pointed out in the following detailed description and in the claims directed to a preferred form of the invention, it being understood, however, that various changes in the specific embodiment thereof may be made, without departing from the spirit and scope of the invention as described herewith.

In the drawings, forming a part of this application:

Figure 1 is a vertical longitudinal sectional view through a portion of an automobile, showing the portions of the floor board at its juncture with the dash board, the brake pedal, and the steering post of the automobile, with the improved invention applied thereto and illustrated as holding the brake pedal in depressed and set position.

Figure 2 is a sectional view, taken on the line 2—2 of Figure 1.

Figure 3 is a detail view of the brake pedal setting device forming the subject matter of this invention, taken on the line 3—3 of Figure 2.

Figure 4 is an enlarged detail perspective view of the main supporting bracket.

Figure 5 is an enlarged detail view of the end portion of the brake pedal setting screw, showing the manner of providing a universal mounting of the pedal engaging head thereon.

Figure 6 is a view of the pedal setting screw and the mounting therefor on the main supporting bracket, showing the use of a spacing member for changing the relative position of the setting screw to said bracket.

Figure 7 is a detail perspective view on an enlarged scale of the spacing plate, as shown in Figure 6.

Figure 8 is a detail view, similar to Figure 6, of the setting screw and mounting therefor showing the use of a wedge member for changing the angular relation of the setting screw with respect to the supporting bracket.

Figure 9 is a detail perspective view of the wedge member, and

Figure 10 is a plan view of the supporting bracket as shown in Figure 4 attached to the steering column of an automobile, showing the pedal setting screw and mounting therefor connected to the upper portion of the bracket adjacent its mounting on the steering column.

Figure 11 is a detail perspective view of a U-bolt for adjustably mounting a screw mounting member on the main supporting bracket.

The steering column of an automobile is indicated at 1, the dash board at 2, the inclined forward end of the floor board at 3, and the usual brake pedal at 4. In the various makes of automobiles now in general use, the relation of these parts varies slightly in each make, so that the brake pedal 4 with respect to the steering column 1 varies slightly in each different car. In the construction of a pedal setting device, adapted for application to the various makes of automobiles, it will at once be appreciated that it is necessary to provide a construction which is capable of adjustment, in order that it may be accommodated to the various makes of cars in a convenient manner.

In carrying out the invention, in accordance with the above consideration, a main supporting bracket 5 is provided, which is formed of an angular strip of metal, as clearly illustrated in Figure 4, having one arm 6 thereof formed at its outer end with a semi-cylindrical portion 7, adapted to engage around half of its steering column 1, and with which cooperates a detachable bracket member 7, removably secured thereto by suitable bolt nut connections 8, so that the device may be readily applied or removed from the steering column of an automobile. The openings 9, at opposite sides of the semi-cylindrical portions 7 in the arm 6 of the member 5, are adapted to receive the bolts of the connections 8, as illustrated in Figure 1. The portion of the arm 6, adjacent its connection with the arm 10 is formed with a pair of openings 11 and 12 respectively, for a purpose which will be presently described. The arm 10 of the angle member 5 is provided with a pair of aligned slots 13, which are adapted to receive the ends of a U-bolt 14, for securing the screw mounting member 15 to the arm 10, when the nuts 16 are tightened on the threaded end of said U-bolt.

The mounting member 15 is provided with a plate portion 17 having an opening at 18, for one leg of the U-bolt and an arcuate slot 19, concentric with the other opening 18 for the other leg of the U-bolt, in order to permit of a free adjustment of the mounting member 15 on the arm 10 of the bracket member 5. The mounting member 15 is provided with an enlarged portion 20, through which extends and is threadedly mounted a brake pedal setting screw 21, formed at one end with the handle 22, to permit the convenient manual rotation of the screw for feeding through the enlarged portion 20 in the setting of a brake pedal, in a manner which will be presently described. The opposite end of the screw member 21 which may be hereinafter referred to as the brake pedal setting screw is provided with a head 23, on which is mounted a pedal engaging head 24, for universal movement through the socket portion 25 therein, engaging over and receiving the head 23 of the screw member 21.

From the foregoing description, it will be seen that the bracket member 5 may be applied to the steering column of an automobile in any desired position thereon, and the mounting member 15 for the pedal setting screw adjusted to any point between the limits of the slot 19 therein, for obtaining the proper angular relation of the screw member 21 with respect to the main supporting bracket, so that the screw member may be projected against the foot engaging portion of the pedal 4, as illustrated in Figure 1, after which the foot pedal may be depressed to the proper position set therein, while the brakes operated thereby may be properly adjusted to the brake drums on the wheels.

The plate member 15 may also be applied to the arm 6 of the supporting bracket 5 as illustrated in Figure 10, by inserting the U-bolt 14 through openings 11 and 12, in said arm. This permits the adjustment or positioning of the screw member 21 so that it will be adapted to operate the brake pedal of certain types of automobiles.

As this described construction is limited to various makes of automobiles, in its application, through the limits of adjustment of the screw member 21 and the main supporting bracket being insufficient to permit the attachment of the bracket to the steering column and at the same time, sufficient adjustment of the pedal setting screw obtained, for engaging the brake pedal, it may be found desirable to use a spacing plate, as illustrated at 26, in Figures 6 and 7 which is provided with openings 27 adapted to receive the legs of the U-bolts 14, so that it may be positioned between the mounting member 15 and the main supporting bracket 10 for changing the position of the screw member 21, with respect to said supporting bracket. A further adjustment may be made by changing the mounting of the screw mounting member 15 from one side of the main supporting bracket to the other side thereof, together with the use of the spacing plate 26, in either position. Under some conditions, the use of the spacing plate 26 with the main supporting bracket 5 and the plate holding member 15 may be not adapted to position the setting screw in proper position to engage the brake pedal, so that a wedge member 28 is provided, as illustrated in Figure 9, which may be used between the mounting member 15 and the arm 10 of the supporting bracket, in the manner as shown in Figure 8, so that the setting screw may be positioned at an angle relative to its normal position, as above described, on the supporting bracket. The wedge member may also be positioned with the second end positioned at the opposite side of the arm member 10, from that illustrated in Figure 8, in order to impart an angular relation of the setting screw opposite to that shown with respect to the supporting bracket. It is to be further understood that both the wedge member and the spacing plate 26 may be used in conjunction for effecting a further setting of the screw member 21, relative to the supporting bracket 5, in order to position the head 24 of the screw member so that it will engage the brake pedal, on some makes of cars.

From the above description, it should be clearly understood that a brake pedal setting device has been provided which is substantially simple in construction, and formed of relatively few parts, to provide for a large number of adjustments between the pedal setting screw 21 and the supporting bracket 5 to accommodate the device to application on various makes of cars, where the position of the brake pedal and the steering column differ. In this way, it may be further understood that the supporting bracket 5 may be positioned in any desired place on the steering column of an automobile, on which it is desired to adjust the brake band in order that the screw member 21, may then be positioned or adjusted on the supporting bracket, so that it will engage and operate the bracket pedal to the desired set position by rotation of the screw member through the operation of handle 22. By the use of this invention, it will thus be seen that the stroke of operation of the brake pedal of any automobile may be previously determined by applying this invention to the automobile in the manner above described, and setting the pedal to the position at which it is desired to apply the brakes. Following this, a mechanic adjusts all of the brake bands to engage the brake drum with an even tension, whether in the case of two wheel brakes or four wheel brakes, and as a result of which an even application of each of the brakes on its respective drum may be obtained so that an equalized braking pressure is applied to all wheels. This invention also permits of the changing of the position of application of the brake according to the position of the foot pedal, by ascertaining the position of the foot pedal at which the brakes are applied, and then adjusting the brakes and adjusting the screw member 21, to position the pedal at the position where it is desired to have the brakes engage the drums of the several wheels. It will thus be seen that a simple and yet efficient device has been produced, by the present invention, which eliminates the requirement of a helper to a mechanic and by which a mechanic may accurately, quickly and conveniently adjust the brakes of any automobile, at a minimum cost to the owner, and thereby render more efficient service.

What is claimed is:

1. A pedal depressor of the class described comprising a bracket adapted to be mounted upon a relatively stationary part of a vehicle adjacent a pedal to be depressed, a depressing and retaining screw carried by said bracket, a pedal engaging head mounted for universal movement upon said screw and adapted to bear directly against the foot piece of the pedal, and said screw being pivotally connected to said bracket whereby to permit the relative angularity to be varied.

2. An automobile pedal depressor of the class described comprising an attaching bracket adapted to be attached to a relatively stationary part of the automobile adjacent the pedal to be depressed, a vertically disposed depressing and retaining screw, a pedal engaging head universally mounted upon the lower end of said screw, and a connection between said screw and bracket comprising a mounting embodying a pivotally mounted plate having an arcuate guide slot, and a screw threaded sleeve through which said screw is threaded.

3. An automobile pedal depressor of the class described comprising an attaching bracket including a two part clamp and a right angularly extending arm provided with spaced elongated slots, a U-bolt adjustably mounted in one of said slots, a screw mounting member comprising a segmental plate pivoted upon one arm of said bolt and having an arcuate slot adjustable upon the other arm, a screw threaded sleeve carried by said plate, a feed screw threaded through said sleeve, and a pedal engaging head mounted for universal movement upon the lower end of said screw.

In testimony whereof I affix my signature.

WILLIAM R. TAGUE.